Figure 7:
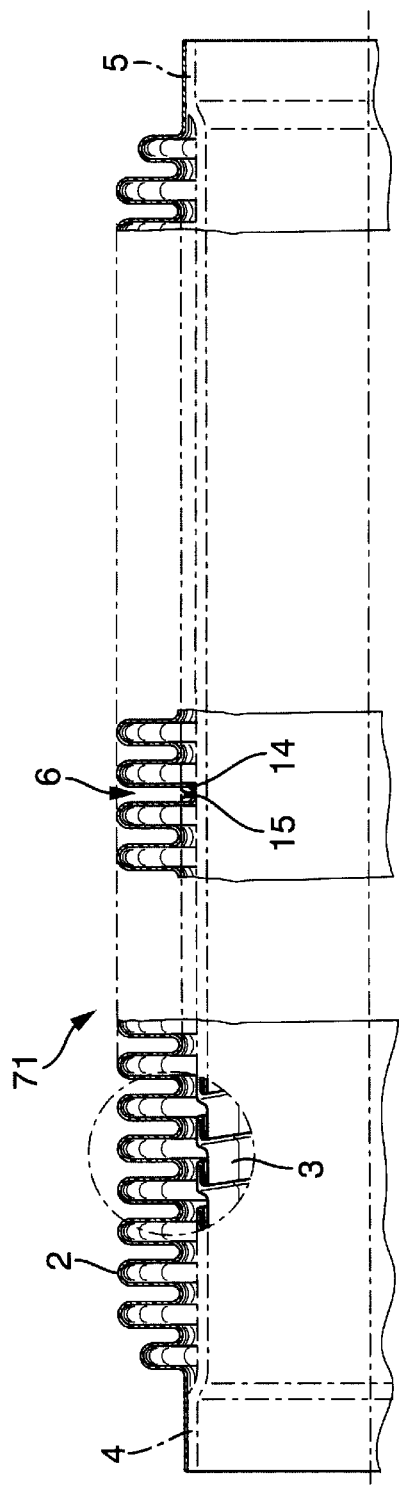

United States Patent
Elsässer et al.

[11] Patent Number: 6,125,889
[45] Date of Patent: Oct. 3, 2000

[54] FLEXIBLE CONVEYING ELEMENT

[75] Inventors: Fabian Elsässer, Straubenhardt; Tom Krawietz, Birkenfeld; Michael Pluschke, Neuenbürg-Rotenbach, all of Germany

[73] Assignee: Witzenmann GmbH, Metallschlauch-Fabrik Pforzheim, Pforzheim, Germany

[21] Appl. No.: 09/307,428

[22] Filed: May 10, 1999

[30] Foreign Application Priority Data

May 9, 1998 [DE] Germany ............ 198 20 863

[51] Int. Cl.$^7$ ............................................. F16L 11/00
[52] U.S. Cl. .................. 138/118; 138/129; 138/122; 138/134; 138/135
[58] Field of Search ................. 138/118, 118.1, 138/119, 134, 137, 122, 135

[56] References Cited

U.S. PATENT DOCUMENTS

| | | |
|---|---|---|
| 507,877 | 10/1893 | Bowley ............ 138/135 X |
| 3,773,087 | 11/1973 | Katayama ............ 138/120 |
| 4,307,754 | 12/1981 | Muratsubaki ............ 138/118 X |
| 4,315,558 | 2/1982 | Katayama ............ 181/227 |
| 4,854,416 | 8/1989 | Lalikos et al. ............ 138/131 X |
| 5,601,893 | 2/1997 | Strassel et al. ............ 138/118 X |
| 5,819,807 | 10/1998 | Reed ............ 138/118 X |
| 5,901,754 | 5/1999 | Elsasser et al. ............ 138/118 |

FOREIGN PATENT DOCUMENTS 196 41 963 10/1997 Germany.
197 44 663 4/1998 Germany.

*Primary Examiner*—Patrick Brinson
*Attorney, Agent, or Firm*—Venable; George H. Spencer; Robert Kinberg

[57] ABSTRACT

A flexible conveying element, in particular for the exhaust systems of automotive combustion engines, having a helically or annularly corrugated metal hose which is installed coaxially in the metal bellows. The outside diameter of the metal hose is smaller than the inside diameter of the bellows and the ends of the hose are situated inside the end fittings of the bellows. The metal hose has an interlocked profile and the bellows and the hose are in an at least indirect contact with each other in at least one additional zone between the two end fittings.

15 Claims, 6 Drawing Sheets

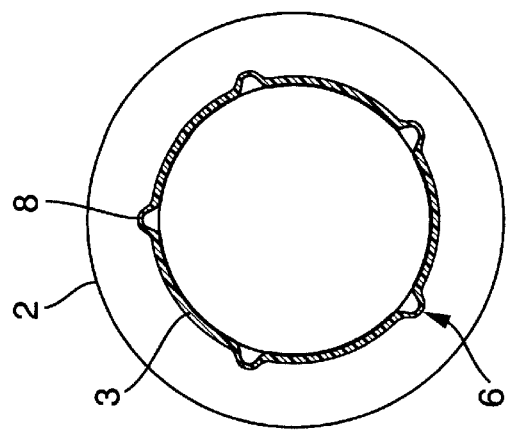
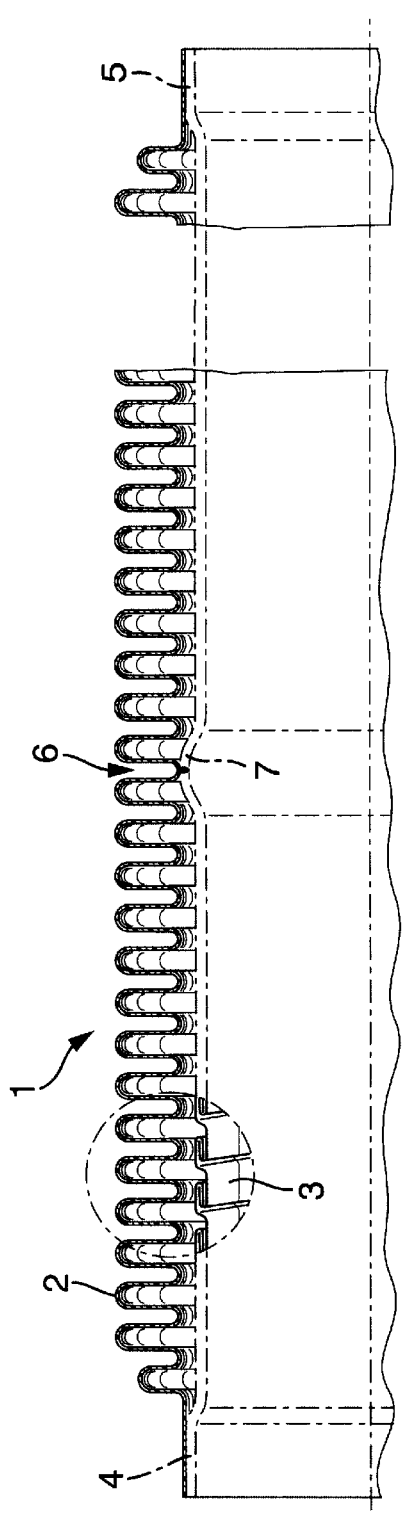
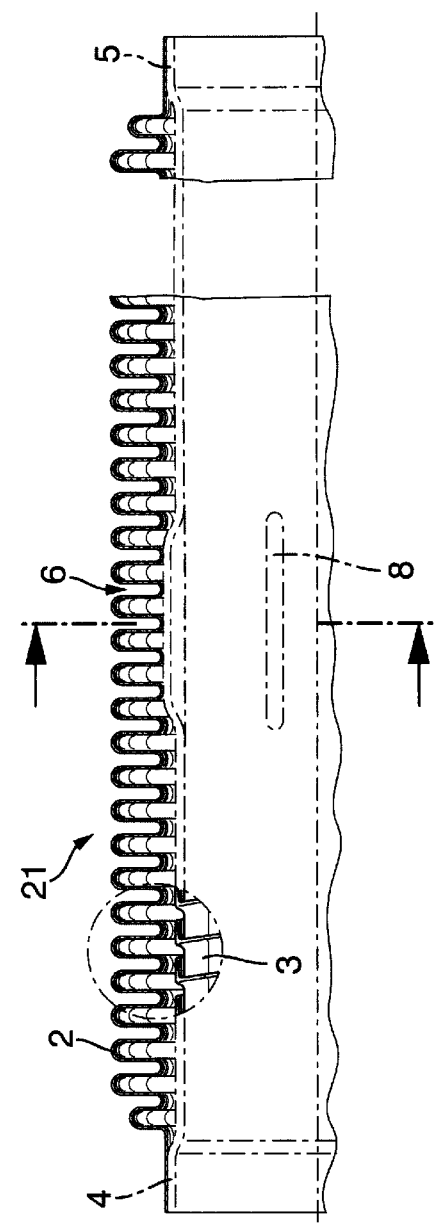
Fig. 1
Fig. 2

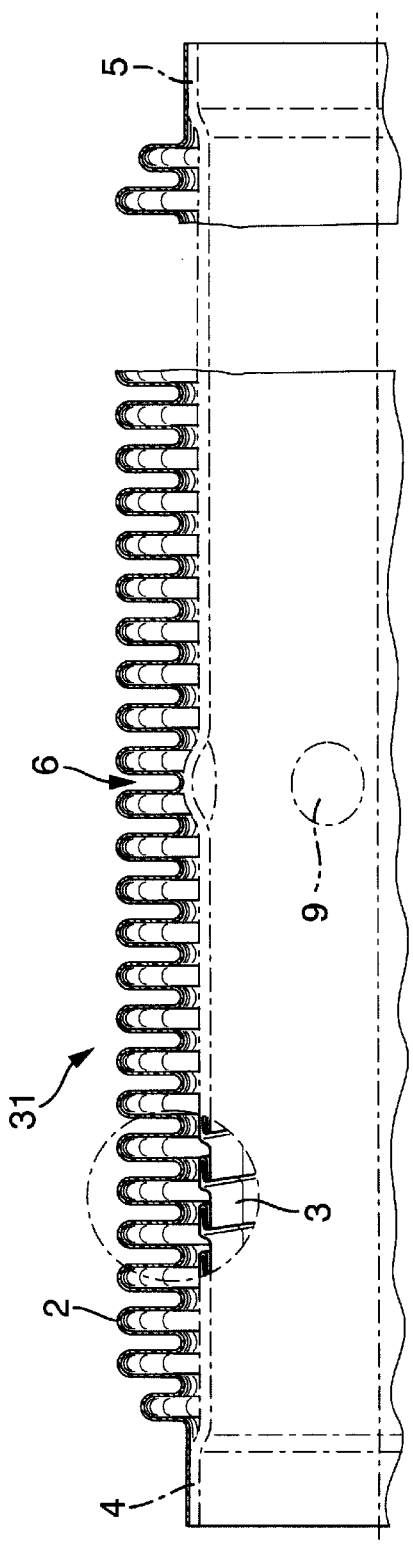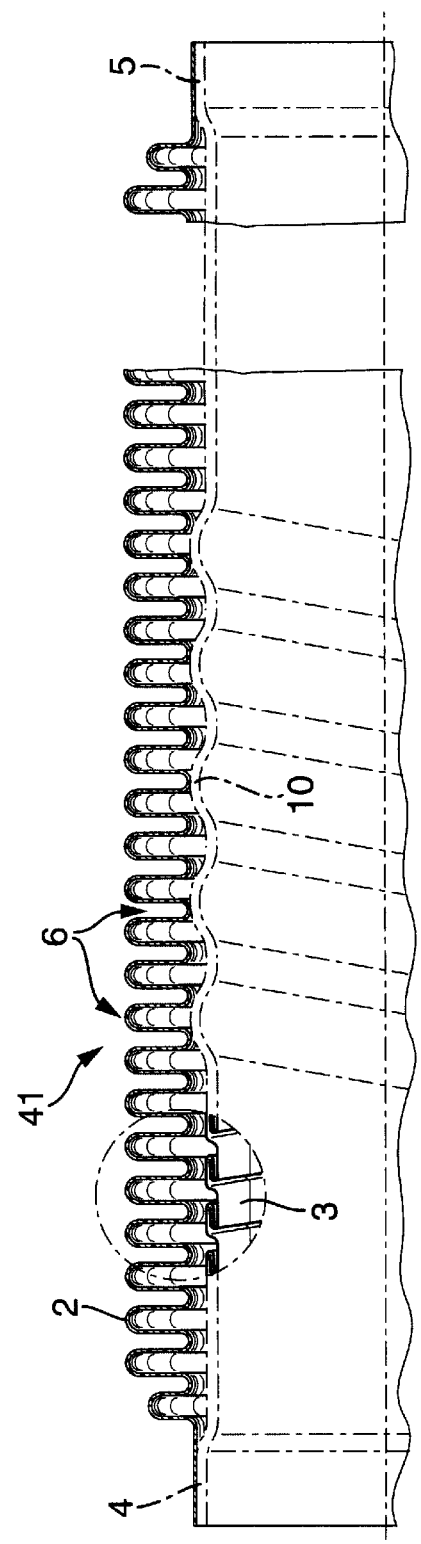

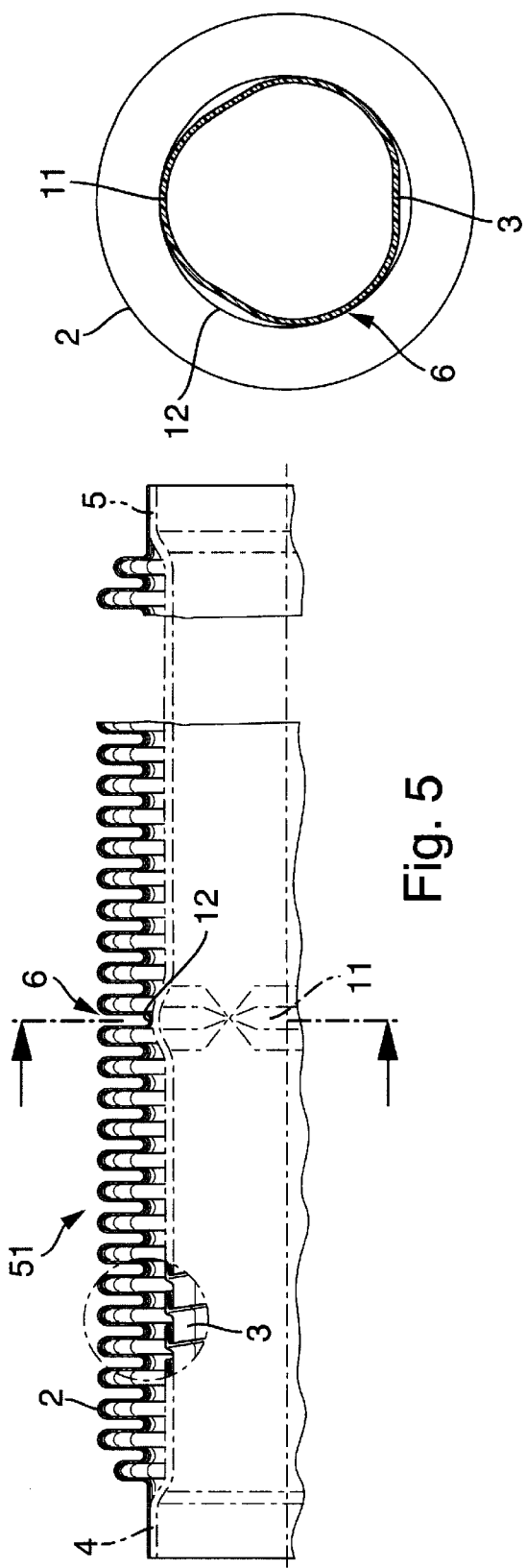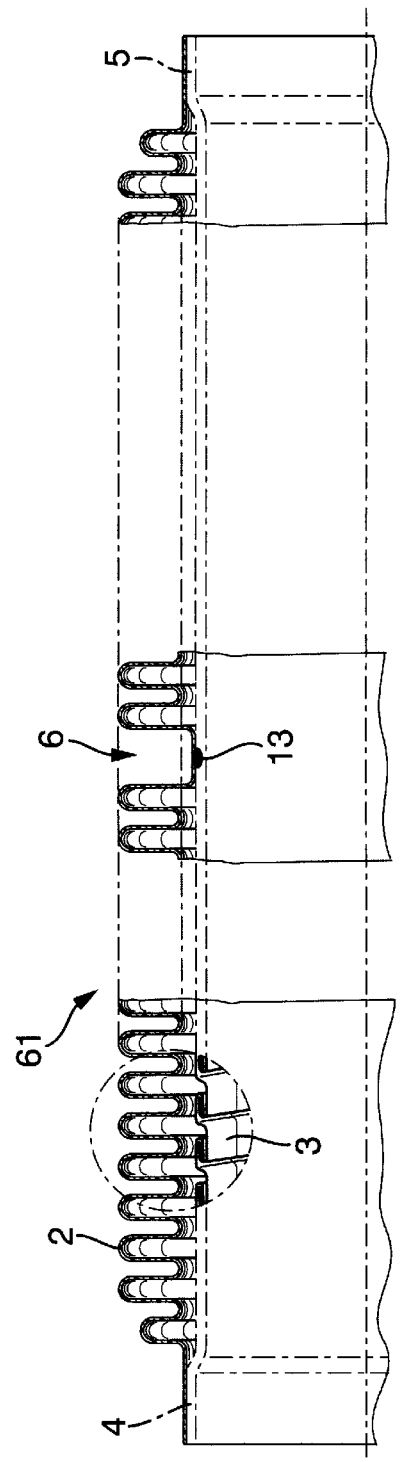
Fig. 5
Fig. 6

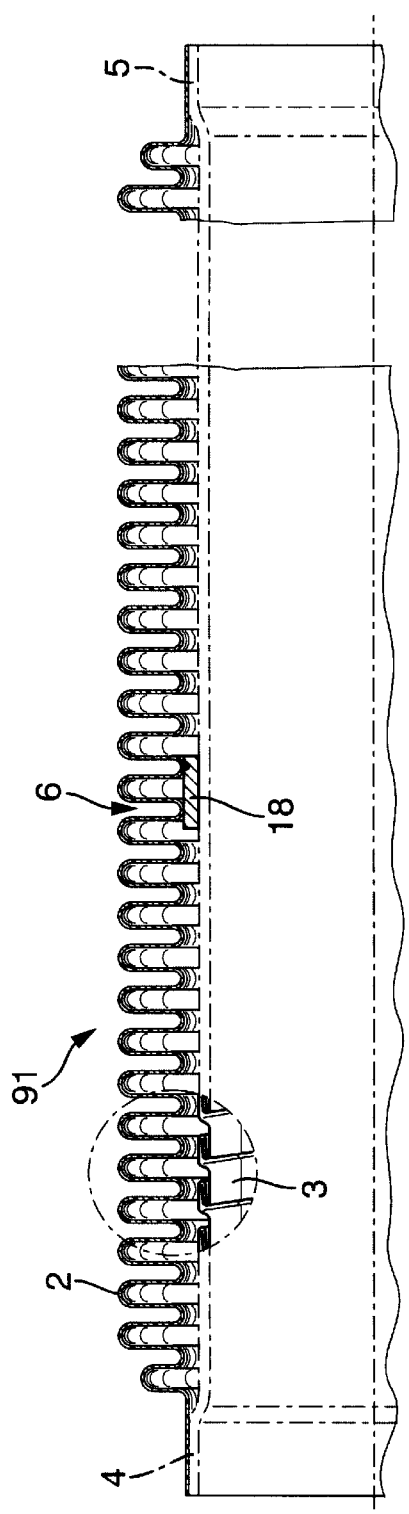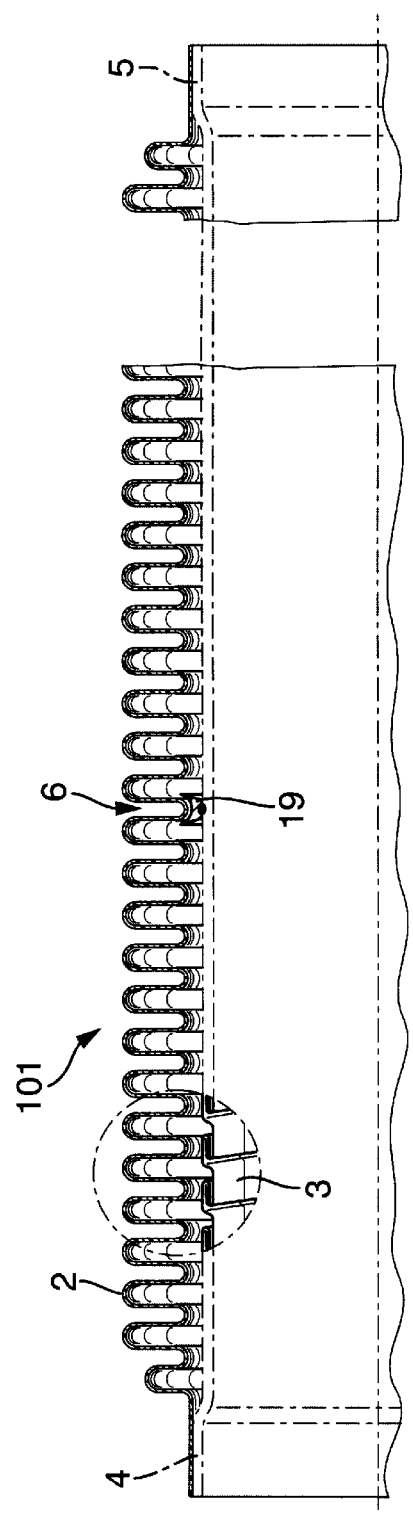

FLEXIBLE CONVEYING ELEMENT

CROSS-REFERENCE TO RELATED APPLICATION

This application claims the priority of Patent Application No. 19820863.4 filed in Germany on May 9, 1998, the subject matter of which is incorporated herein by reference.

This invention was made for the purpose of constructing a flexible conveying element, in particular for the exhaust systems of automotive combustion engines, with a helically or anullarly corrugated metal bellows equipped with cylindrical end fittings and a metal hose which is installed coaxially in the metal bellows, whose outside diameter is smaller than the inside diameter of the bellows, and whose ends are situated inside the end fittings of the bellows and are fixed to them.

As an essential problem of conveying elements with such a design, which are applied in particular for the decoupling of vibrations from adjacent components, the bellows and the metal hose will hit each other under specific vibration frequencies, above all within the resonance range, which will cause a disturbing emission of noise. In the past, various solution attempts were made to avoid such an emission of noise; for example, damping elements made of metal wire, such as wire mesh, braiding hoses, etc., were arranged between the bellows and the metal hose in order Lo damp the vibrations of the bellows and the metal hose; additionally, the distance between the metal hose and the bellows was increased in order to reduce the possibility of a contact between these two parts. It is easily recognizable that the consequence of these measures was an increase in effort and thus in expense, and that also an increase in the exterior dimensions of the conveying element is required if the internal distance becomes larger. This would require an accordingly larger installation space which is, in general, not available.

On the basis of the aforesaid facts, this invention was made for the purpose of providing a conveying element of the initially described design, whose noise emission characteristics are more favorable and which allows for an improvement in respect to price and installation space in comparison with conventional solutions.

This task has been solved according to the invention by designing a flexible conveying element with the initially quoted features, in which the bellows and the metal hose are in an at least partial and at least indirect contact with each other in at least one additional zone between the two end fittings. Such a defined contact in an optional position which should in particular be adapted to the vibration characteristic of the bellows and/or the metal hose, will first counteract the relative movements of these components towards each other, since the two components are already in contact with each other. They therefore cannot hit each other, which will avoid the emission of noise. As an additional consequence of this contact, the vibration behavior of the bellows and the metal hose will change.

This means that, in a conventional element, the total axial length can oscillate freely between the two end fittings. Even a low excitation amplitude can cause resonance in the axial central section due to the movements of the components connected with the conveying element(as, for example, exhaust system or engine), whereas a permanent direct contact of the metal hose and the bellows in an intermediate axial section reduces the free length between two support points, for example, by half, with the consequence of an extreme reduction of the vibration amplitude despite high angular, axial or lateral excitation.

The probability of a contact of bellows rims and metal hose in the other sections of the conveying element will thus be reduced considerably. A simple designing measure will, on one side, avoid the insertion of a damping element and, on the other side, also allow for a minimization of the distance between the metal hose and the bellows, with the consequence of a corresponding reduction of the exterior dimensions of the flexible conveying element.

There are several possibilities of establishing contact between the two parts. It is particularly advantageous to establish contact by forming the bellows and/or the metal hose, i.e. by an at least partial, radial expansion of the metal hose and/or by an at least partial, radial contraction of the bellows. The easiest way of accomplishing such a reduction of the bellows diameter by drawing a corrugation inwards until the reduced inside diameter of the bellows corresponds the outside diameter of the metal hose, with the consequence of a contact between the two parts.

It can also be recognized that, in the easiest case, the contact between the two parts can run radially over the whole radial length of the metal hose and/or the bellows. The contact line does not necessarily have to run in an annular course. A helical or accordingly modified course is also possible.

It is, however, particularly advantageous to establish the contact between the two parts by forming specific sections which will improve the contact between the two parts by means of inducing pre-stress into the formed sections, with this pre-stress being oriented towards the other component. With this design, the zones adjacent to the contact sections have a certain elastic deformability, since they are not in direct contact with the other component. One example for such a partial contact is an ovally contracted bellows which surrounds a metal hose with circular cross section, thus establishing contact only in the oval zones with a smaller diameter.

A partial contact, i.e. a contact which is not continuous in radial direction also provides advantages in manufacturing, since such punctiform deformations can be applied easier to metal hoses or bellows with a generally round cross section.

Such partial contacts can be arranged radially or axially, on order to allow for an adaptation of the movability of the conveying element according to this invention or its vibration behavior to the individual conditions. One of the targets in accomplishing the specific function of the conveying element is the avoidance or minimization of a reduction in its movability due to the contact between the parts, thus guaranteeing the desired decoupling of low-frequency relative movements and high-frequency vibrations between the components connected to the conveying element.

In respect to the kind of contact, a mutual frictional contact may very well be sufficient. The frictional contact should then fix the bellows and the metal hose in both radial and axial direction. For reasons of reliability of the fixing contact, and of the wear occurring between the contact zones, it may be recommendable to fix the parts by means of welding or press-fitting. A welding process can, for example, be carried out by means of a laser welding equipment or by means of spot welding. When applying one of these methods, it may be recommendable, due to the generally low wall thickness of the bellows and metal hose materials, to include an additional interior or exterior annular insert into the welded connection. This annular insert will provide the required material stability and will avoid a destruction of the welded connection before the expiration of the service life.

It may also be advantageous to apply such an annular insert between the metal hose and the bellows, with the consequence of an indirect contact established by, for example, an annular insert, instead of a direct contact between these two parts. Such an insert can also be fixed to the bellows and/or the metal hose by welding. As an advantage of the insert, an additional forming of the bellows or the metal hose is not required. A simple and economical solution, which still has the advantages of an alteration of the vibration characteristics and of a reduction of the noise emission of the conveying element, can thus be provided.

It has already been mentioned that, in respect to the position of the mutual contact, it is particularly recommendable to adapt this position to the vibration characteristic of the bellows and/or of the metal hose. It would be advantageous to take into consideration the contact positions at the maxima of the vibration characteristic in order to accomplish a sufficient noise reduction in the conveying element with a small number of contact zones.

In the easiest method of establishing mutual contact, the contact zones are situated approximately in the middle of the axial length of the conveying element, at least in the case of a relatively uniform distribution of vibrations over the axial length of the conveying element.

In respect to the overall design of the conveying element, the well-known principle of covering the bellows with a wire braiding in a direct contact between these two parts can be applied. In this specific case, the ends of the bellows and of the metal hose are connected with each other and with a cylindrical supporting ring by means of press-fitting, and the parts are attached to each other in individual spots. Such an exterior braiding hose protects the bellows against external damage and prevents an undesirable increase in length.

For the manufacturing of the metal hose, it can be provided that this hose is wound from a metal strip, perhaps without sealing insert, with the possibility of a radial expansion of the ends of the metal hose which are situated within the end fittings of the bellows, combined with a compression of the hose profile and a compensation of the clearance between the hose ends and the end fittings of the bellows.

Figure 8:
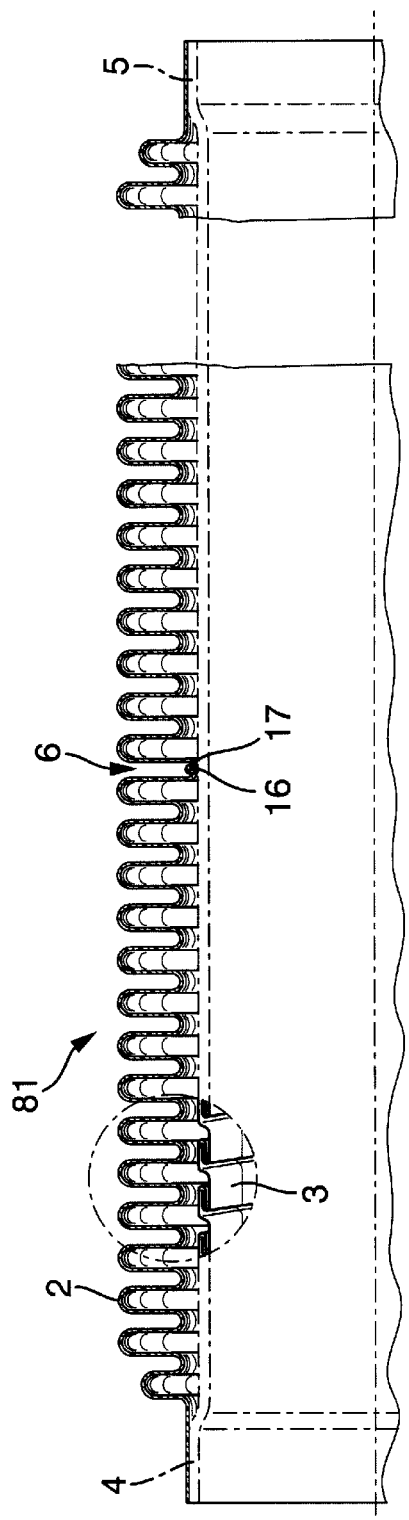
Figure 11:
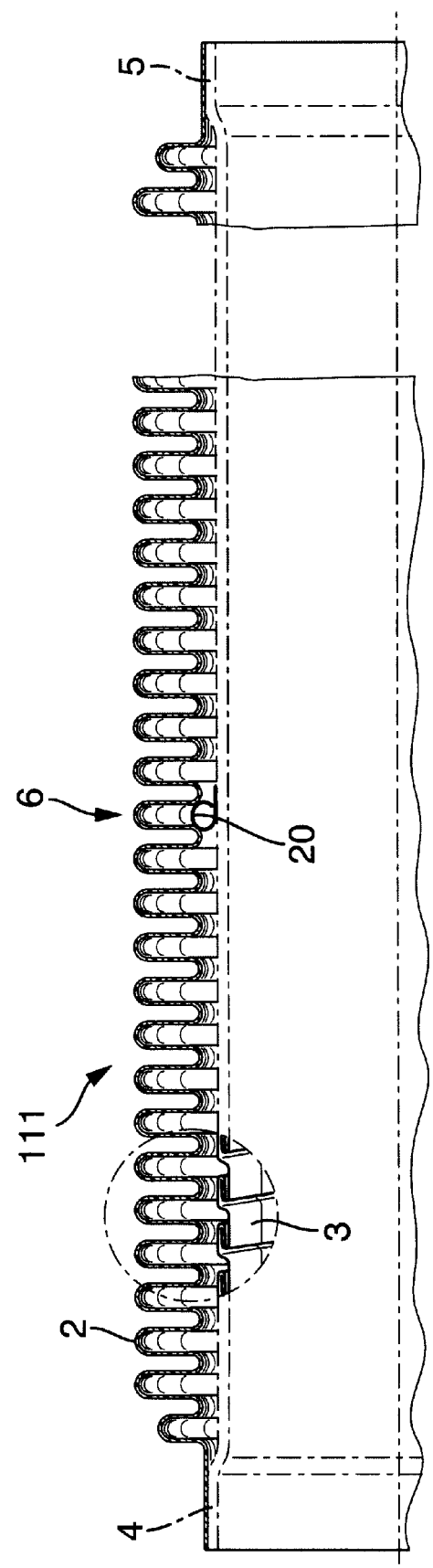

Further features and advantages of this invention are included in the following description of a specific version on the basis of the annexed drawings, with FIGS. 1–5 showing a flexible conveying element with an expanded metal hose in a partial lateral section;

FIGS. 6–8 showing a flexible conveying element with a contracted bellows in partial lateral section; and FIGS. 9–11 a conveying element with annular insert in partial lateral section.

In the accompanying text the same components are identified by the same reference numerals, even if they differ in design.

Accordingly, a conveying element 1 as shown in FIG. 1 consists of an annularly corrugated metal bellows 2, as well as of a helically stripwound metal hose 3 which is installed coaxially inside the bellows; with the metal hose and the bellows being fixed to each other in the zone of their cylindrical end fittings by means of welding. For this purpose, their diameters have been adapted to each other in the zones of these end fittings so that the total surfaces of their ends are in contact with each other which can be accomplished, for example, by means of press-fitting. The clearance which, under normal conditions, exists between the bellows and the metal hose due to the fact that the outside diameter of the hose is smaller than the inside diameter of the bellows, is eliminated in this process.

In the zone between the two end fittings, FIG. 6 provides a contact zone 6 in which the metal hose and the bellows are in full radial contact with each other. This contact can be supported by means of a welded connection. This contact will halve the axial length of the freely movable sections of the conveying element, with the consequence of a corresponding reduction of the vibration amplitude. It can thus be prevented that the metal hose and the bellows hit each other due to mutual relative movements, which would cause an undesirable emission of noise.

In the example shown in FIG. 1, the contact between the parts is established by means of a radial expansion of the metal hose 7, whose outside diameter is increased until the hose comes in direct contact with the bellows.

The example shown in FIG. 2 also provides a radial expansion of the metal hose 3 in a conveying element 21. The cross-sectional view of the conveying element included in FIG. 2 shows that, in this case, this effect is not accomplished by a uniform radial expansion but by the application of, for example, five elongated groove-like expansions which are parallel to each other and to the hose axis. As a result, there are only five radial contact zones, and contact is not established by means of a welded connection but only on the basis of friction.

FIG. 3 shows a design similar to that of the conveying element 21 in FIG. 2. In this case, the partial contact 6 in the conveying element 31 is accomplished by arranging punctiform protrusions 9 radially on the metal hose 3. These protrusions have an effect similar to that of the linear expansions 8 shown in FIG. 2.

FIG. 4 shows a conveying element 41, in which the metal hose 3 has helical expansions 10 which provide several adjacent contact zones 6. This helical design allows for an easier connection of the metal hose to the bellows since, in this case, the connection is established by pushing the hose into the bellows in a rotating movement corresponding with the winding direction of the helix. FIG. 5, being the final example of an expanded hose, shows a conveying element 51, whose metal hose 3 has a polygonal expansion 11, as can be recognized in particular from the cross-sectional view shown in the right section of FIG. 5. This design provides three radial partial contact zones 6 which allow for a mutual pre-setting. This pre-setting guarantees a direct contact free of clearance even for a long service life. In the conveying element 51, the contact between the parts is established by both a deformation of the metal hose and a reduction of the diameter of the bellows 2. In the contact zone 6, the corrugation groove 12 of this bellows has a smaller inside diameter than the other corrugation grooves of the hose 2.

FIG. 6 shows a similar design, in which one corrugation groove 13 of a bellows 2 of a conveying element 61 is drawn inwards by a greater distance than the adjacent corrugation grooves. It also has a greater axial extension for the purpose of increasing the contact zone, and is connected with the metal hose 3 in the contact zone by welding or press-fitting.

The conveying element 71 shown in FIG. 7 has a corrugation groove 14 with a smaller inside diameter, which is, as the corrugation in the foregoing example, situated in the contact zone 6. This figure provides the application of a spring washer 15 on the exterior surface of the corrugation groove 14 for the purpose of increasing the resistance of the press-fitting connection. This spring washer can be welded to the adjacent section of the metal hose 3, similar to a spring washer 16 applied in the conveying element 81 shown in FIG. 8, which is also situated in a corrugation groove 17 with a reduced diameter.

FIG. 9 shows a conveying element 91 which has an annular insert 18 in the contact zone 6, which is inserted between the metal hose 3 and the bellows 2 and eliminates the clearance between these two parts. This design establishes an indirect contact free of clearance between the metal hose and the bellows, with the bellows 3 being partially welded to the annular insert 18 in order to provide a firm contact.

The conveying element 101 shown in FIG. 10 also has an annular insert 19 between the bellows and the metal hose, which covers the distance between these two parts and is welded to the metal hose 3. Whereas the annular insert 18 shown in FIG. 9 has a simple cylindrical shape, The exterior outline of the annular insert 19 shown in FIG. 10 is adapted to the interior outline of the corrugation groove in the contact zone 6. The contact surface can thus be increased.

FIG. 11 shows a conveying element 111 with an annular insert 20 between the metal hose 3 and the bellows 2, whose interior surface is fixed to the metal hose 3. The exterior outline of the annular insert 20 shows bends and curvatures which are interlocked with a corrugation groove 22 in the contact zone 6 and provides a contact between the two parts by means of elastic pre-setting. This annular element has several elastic radial sections which are bent and, because of their elasticity, allow for an easier connection of the metal hose to the bellows, if the metal hose is inserted into the bellows in the correct direction i.e., as FIG. 11 shows, from the left.

It can be summarized that, as a great advantage of this invention, the corresponding conveying element provides a reduction of dimensions and material requirements, combined with a considerable decrease in the emission of noise by establishing a defined contact between the metal hose and the bellows.

What is claimed is:

1. Flexible conveying element, in particular for the exhaust systems of automotive combustion engines, with a helically or annularly corrugated metal bellows equipped with cylindrical end fittings and a metal hose which is installed coaxially in the metal bellows, whose outside diameter is smaller than the inside end fittings of the bellows and are at least indirectly fixed to them, said metal hose having an interlocked profile, and said bellows and said hose being in an at least partial and at least indirect contact with each other in at least one additional zone between the two end fittings.

2. A conveying element according to claim 1, wherein said hose is helically stripwound from at least one metal strip.

3. Conveying element according to claim 1, wherein the mutual contact is established by forming said bellows and/or said metal hose accordingly.

4. Conveying element according to claim 3, wherein an at least partial radial expansion is formed in said metal hose.

5. Conveying element according to claim 3, wherein an at least partial radial contraction is formed in said bellows.

6. Conveying element according to claim 3, wherein the formed section runs over the whole circumference of said bellows and/or said metal hose.

7. Conveying element according to claim 1, wherein said bellows and said metal hose are in a mutual frictional contact.

8. Conveying element according to claim 1, wherein said bellows and said metal hose are fixed to each other in contact zone, in particular by means of welding or press-fitting.

9. Conveying element according to claim 8, wherein said bellows and said metal hose are fixed to each other by welding or press-fitting.

10. Conveying element according to claim 1 wherein there is only indirect contact between said bellows and said metal hose, which is established by an insert between said bellows and said metal hose, said insert being in direct contact with said metal hose.

11. Conveying element according to claim 1, wherein said insert is annular.

12. Conveying element according to claim 10, wherein said insert is fixed to said bellows and/or to said metal hose by welding.

13. Conveying element according to claim 1, wherein the position of the at least partial contact is adapted to the vibration of characteristic of said bellows and/or of said hose and corresponds with the position of the maximum of the vibration characteristic of said bellows and/or of said metal hose.

14. Conveying element according to claim 1, wherein the position of the at least partial contact is situated approximately in the middle of the axial length of the flexible conveying element.

15. Conveying element according to claim 1, wherein at least two partial contact positions are distributed over the circumference and/or the axial length of said bellows and of said metal hose.

\* \* \* \* \*